United States Patent

Toya et al.

Patent Number: 4,734,483
Date of Patent: Mar. 29, 1988

[54] CHOLESTERIC LIQUID CRYSTAL POLYESTER FROM HYDROQUINONE, CYCLOHEXANE DICARBOXYLIC ACID AND 3-METHYL ADIPIC ACID

[75] Inventors: Tomohiro Toya; Tetsuo Satoh; Shigeki Iida, all of Yokohama; Hajime Hara, Fujisawa; Shingo Orii, Kawasaki, all of Japan

[73] Assignee: Nippon Oil Company, Limited, Tokyo, Japan

[21] Appl. No.: 899,076

[22] Filed: Aug. 21, 1986

[30] Foreign Application Priority Data

Aug. 23, 1985 [JP] Japan .................................. 60-183905

[51] Int. Cl.⁴ .............................................. C08G 63/16
[52] U.S. Cl. .................................... 528/194; 528/176; 528/191
[58] Field of Search ...................... 528/194, 191, 176

[56] References Cited

U.S. PATENT DOCUMENTS 3,143,526 8/1964 Caldwell et al. ..................... 528/194

Primary Examiner—Harold D. Anderson
Attorney, Agent, or Firm—Scully, Scott, Murphy & Presser

[57] ABSTRACT

A cholesteric liquid crystal polyester consisting essentially of structural units represented by the following formulae (A), (B) and (C):

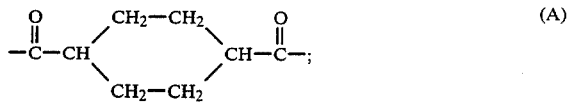

(A)

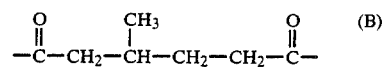

(B)

which is optically active; and

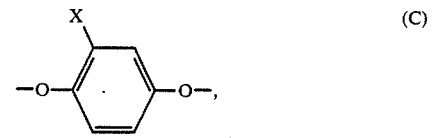

(C)

wherein X is hydrogen, halogen, or alkyl having not more than four carbon atoms.

3 Claims, No Drawings

CHOLESTERIC LIQUID CRYSTAL POLYESTER FROM HYDROQUINONE, CYCLOHEXANE DICARBOXYLIC ACID AND 3-METHYL ADIPIC ACID

BACKGROUND OF THE INVENTION

The present invention relates to novel aromatic polyesters capable of being subjected to melt-processing having high strength and high modulus and less anisotropy of mechanical properties.

Recently there has been increasing demand for materials which when formed into fibers, films and shaped articles exhibit high modulus and resistance to heat and to chemicals. Although polyesters are in use for various shaped articles, many of them are inferior in mechanical properties such as flexural modulus and have therefore been unsuitable heretofore for uses requiring high strength and high modulus. As a method for improving such mechanical properties there has been known incorporating fillers or reinforcing materials such as calcium carbonate or glass fibers into polyesters. However, this method causes problems in practical use; for example, the light weight characteristic, which is a feature of plastics, is lost because of increase in specific gravity of the resulting blend, and when the blend is processed, the processing machine is subjected to heavy wear.

Liquid crystal polyesters have come to be noted recently as polyesters suitable for uses requiring high strength and high modulus even without using reinforcing materials or the like. Special attention has been paid to such polyesters since W. J. Jackson made public a thermoplastic liquid crystal polyester comprising polyethylene terephthalate and hydroxybenzoic acid in U.S. Pat. No. 3,804,805 and Journal of Polymer Science Polymer Chemistry Edition, Vol. 14, page 2043 (1976). Since then, various liquid crystal polyesters have been developed and studied with a view to attaining both improvement of strength and modulus, and melt-processability. However, none of them have been put to practical use yet as shaped articles or films. This is because these liquid crystal polymers exhibit a high orientatability in molten condition resulting in creation of a great anisotropy in their mechanical properties.

As means for eliminating such anisotropy and attaining a high modulus and high strength biaxially oriented film, the use of a cholesteric liquid crystal polymer has been proposed by W. R. Krigbaum et al. (see U.S. Pat. No. 4,412,059). According to this proposed method, however, the transesterification is slow and it is impossible to introduce a desired amount of optical active units. Further, in some particular linkage of flexible structural units there may arise problems such as deterioration of physical properties or spoiling the formation of the liquid crystal.

SUMMARY OF THE INVENTION

It is an object of the present invention to provide a novel polyester capable of being subjected to melt processing, having high strength and high modulus, and less anisotropy of mechanical properties.

It is another object of the present invention to provide a cholesteric liquid crystal polymer capable of having a desired amount of optical active units in the polymer chain and thereby having a desired cholesteric helical pitch length.

It is a further object of the present invention to provide a cholesteric liquid crystal polymer whose physical properties are little affected even by the introduction of optical active units as soft segments.

The present invention resides in a cholesteric liquid crystal polyester consisting essentially of structural units represented by the following formulae (A), (B) and (C):

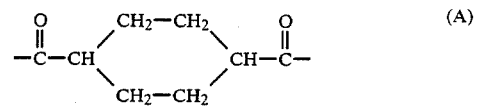

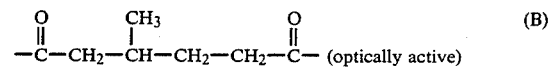

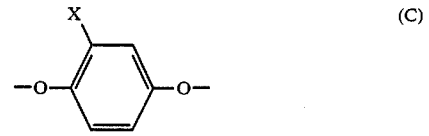

(X is hydrogen, halogen, or alkyl having not more than four carbon atoms.)

DETAILED DESCRIPTION OF THE INVENTION

The cholesteric liquid crystal polyester of the present invention consists essentially of the above three structural units (A), (B) and (C).

The structural unit (A) is derived from cyclohexanedicarboxylic acid or a derivative thereof (e.g. dialkyl ester) and it is present at a proportion of 10 to 49 mol %, preferably 20 to 47 mol %.

The structural unit (B) is derived from 3-methyladipic acid or a derivative thereof (e.g. dialkyl ester) and it is characterized by being optically active. The structural unit (B) is present at a proportion of 1 to 40 mol %, preferably 3 to 30 mol %.

The structural unit (C) is derived from hydroquinone or hydroquinone having a substituent group (halogen or alkyl having not more than four carbon atoms, or a derivative thereof (e.g. diacetylated compound), and it is present substantially at a proportion of 50 mol %.

The total of the structural units (A), (B) and (C) is assumed to become 100%.

The polymerization degree of the cholesteric liquid crystal polyester of the present invention is not specially limited. A polymerization degree which permits the formation of film suffices. Usually, the polyester has an inherent viscosity ($\eta$ inh) of at least 0.4 dl/g.

The structural unit (B) is essential for developing cholesteric mesophase. There may be used either an R or an S isomer resolved from a RS racemic mixture. Even in the case of a RS mixture, if either one is present in a larger proportion, an optical activity is exhibited, and even such a mixture is employable. In this case, however, the helical pitch (P) in a cholesteric liquid crystal becomes larger than that in a like liquid crystal using a pure R or S isomer, and thus the cholesteric mesophase forming ability becomes poor. In general, the difference in content between R and S isomers should be not less than 15%, preferably not less than 30%.

A cholesteric liquid crystal polymer has a helical structure twisted at a certain angle in which a nematic liquid crystal layer is induced by an optically active unit. The cholesteric mesophase will be colored if the pitch of the helical structure falls in the range of visible wave length due to selective reflection.

A cholesteric liquid crystal polymer having a rigid straight chain and an optically active monomer copolymerized in the main chain is expected to afford a film or sheet having a biaxially reinforced structure as if it were a laminated structure.

Thermoplastic polymers such as the cholesteric liquid crystal polyesters of the present invention are characterized by affording shaped articles which are less anisotropic in physical properties while maintaining high mechanical properties even when they result from processing at high shear rates.

As a thermoplastic cholesteric liquid crystal polymer is heated up slowly under a polarizing microscope equipped with a hot stage, it changes from a crystalline state into a liquid crystal state at a certain temperature and according to circumstances an oily streaks texture peculiar to cholesteric liquid crystal polymers is observed. Further, if such polymer is formed into film followed by quenching, there will remain a cholesteric liquid crystal structure, and if the cholesteric helical pitch length is close to visible wave length, it will be possible to observe a bright cholesteric color which varies depending on the content of chiral component of the structural unit (B).

The cholesteric liquid crystal polyesters of the present invention is prepared according to a melt polymerization process. More specifically, the monomers which give structural units (A), (B) and (C) are mixed, melted and heated to a temperature of about 100° to 350° C. at atmospheric pressure, allowing transesterification to take place. For accelerating the transesterification it is desirable to remove low volatile compounds formed such as methanol or acetic acid to the exterior of the reaction system. To this end, it is preferable that the polymerization be conducted under flow of nitrogen if the reaction is performed at atmospheric pressure. After the distilling out of such low volatiles has stopped, the polymerization is further continued under vacuum (e.g. not higher than 1 mmHg) and it is terminated when the conversion reaches approximately 100% and the polymerization degree of the resulting polymer becomes sufficiently large. For accelerating the polymerization reaction, alkali metals as well as metal salts such as Fe, Mn, Cd, Mg, Ba, Ti, Zn, Pb, Co, and Sb salts may be used alone or in combination. The use of catalyst may be omitted. There may be added a phosphorus compound as a decomposition inhibitor.

Generally, by heat treatment after processing, polyesters are enhanced in strength, and the polyester of the present invention also exhibits the same effect and it is further characterized by being less anisotropy of physical properties.

The cholesteric liquid crystal polyester of the present invention thus obtained can be subjected to melt processing at a temperature not higher than 300° C. and the resulting shaped article is characterized by less anisotropy of physical properties and high mechanical characteristics.

The following examples are given to further illustrate the present invention, but it is to be understood that the invention is not limited thereto.

EXAMPLE 1

(1) Preparation of Cholesteric Liquid Crystal Polyester 8.43 g of cyclohexanedicarboxylic acid, 3.36 g of (+)-3-methyladipic acid, 16.00 g diacetylatedchlorohydroquinone and 18 mg of sodium acetate were charged into a reactor equipped with a stirrer, and after purging with nitrogen, reaction was allowed to take place at 150° C. for 60 minutes. Then, the reaction was allowed to proceed at 200° C. for 60 minutes, thereafter for another 30 minutes while passing nitrogen at a rate of 50 cc/min and then further for 90 minutes at 220° C. Subsequently, the reaction was allowed to proceed for 60 minutes under a reduced pressure of 0.2 mmHg and thereafter the temperature was raised to 270° C. over a period of 10 minutes. Under this condition, stirring was continued for 30 minutes to complete the polymerization.

The yield was 91%, and the inherent viscosity ($\eta$ inh) as measured in p-chlorophenol at 50° C. and at a concentration of 0.5 wt. % was 1.22 dl/g. (The following $\eta$ inh values were also measured according to this method.)

(2) Film Forming 1 g of the polymer prepared above was placed in a central part of a 18 cm long by 5 cm wide molding plate made of aluminum (which was so made as to permit only a longitudinal flow), then heated to 270° C. and pressed, followed by cooling in an instant with iced water to obtain a film having a thickness of about 100 $\mu$m. This film had a bright cholesteric color and its CD (circular dichroism) spectrum exhibited a peak at 500 nm.

Test pieces were taken out in both longitudinal and transverse directions from both end portions of this film where flow history was retained, and were measured for mechanical properties. Results are as set out in Table below.

EXAMPLE 2

Polymerization was performed under the same conditions as in Example 1 except that the amount of cyclohexanedicarboxylic acid and that of (+)-3-methyladipic acid were changed to 7.22 g and 4.48 g, respectively. As a result, a polymer having an inherent viscosity $\eta$ inh of 1.02 dl/g was obtained in 82% yield. A film formed from this polymer had a bright cholesteric color and its CD spectrum exhibited a peak at 430 nm. Results of measurement of its mechanical properties are as set out in Table below.

EXAMPLE 3

Polymerizatin was performed under the same conditions as in Example 1 except that the amount of cyclohexanedicarboxylic acid and that of (+)-3-methyladipic acid were changed to 9.64 g and 2.24 g, respectively. As a result, a polymer having an inherent viscosity $\eta$ inh of 1.91 dl/g was obtained in 84% yield. A film formed from this polymer has a bright cholesteric color and its CD spectrum exhibited a peak at 680 nm. Results of measurement of its mechanical properties are as set out in Table below.

EXAMPLE 4

A film formed from the polymer prepared in Example 1 was heat-treated at 230° C. for 16 hours. Like the film before the heat treatment, the film thus heat-treated had a bright cholesteric color and its CD spectrum exhibited a peak at 520 nm. Further, its inherent viscosity $\eta$ inh increased from 1.22 dl/g to 2.90 dl/g. Results of measurement of its mechanical properties are as set out in Table below.

COMPARATIVE EXAMPLE 1

Polymerization was performed under the same conditions as in Example 1 except a racemic mixture was used in place of the (+)-3-methyladipic acid. As a result, a polymer having an inherent viscosity η inh of 1.25 dl/g was obtained in 91% yield. A film formed from this polymer was opaque, but exhibited no cholesteric color. Results of measurement of its mechanical properties are as set out in Table below.

TABLE

| | Mesophase | Wavelength of maximum reflectivity in CD spectrum nm | *1 T∥ MPa | *1 T⊥ Mpa | T∥/T⊥ ratio | *1 M∥ GPa | *1 M⊥ GPa | M∥/M⊥ ratio |
|---|---|---|---|---|---|---|---|---|
| Example 1 | Cholesteric | 500 | 91 | 82 | 1.1 | 2.8 | 2.7 | 1.0 |
| Example 2 | " | 430 | 53 | 35 | 1.5 | 2.2 | 1.8 | 1.2 |
| Example 3 | " | 680 | 65 | 42 | 1.6 | 2.5 | 1.9 | 1.3 |
| Example 4 | " | 520 | 210 | 140 | 1.5 | 3.9 | 3.3 | 1.2 |
| Comparative Example 1 | Nematic | Non | 67 | 25 | 2.7 | 2.7 | 1.0 | 2.7 |

*1 T represents a tensile strength and M represents a tensile modulus.
The subscript ∥ represents a direction parallel to the flow direction and the subscript ⊥ represents a direction perpendicular to the flow.

From the above Examples it is seen that even after being subjected the cholesteric liquid crystal polyesters of the present invention to processing under shear stress their mechanical properties are less anisotropic and maintain high strength and high modulus.

What is claimed is:

1. A cholesteric liquid crystal polyester consisting essentially of structural units represented by the following formulae (A), (B) and (C):

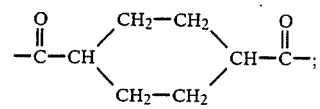
(A)

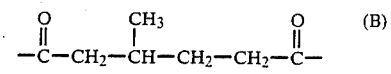
(B)

which is optically active; and

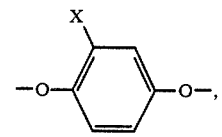
(C)

wherein X is hydrogen, halogen, or alkyl having not more than four carbon atoms.

2. A cholesteric liquid crystal polyester as set forth in claim 1, characterized by containing the structural units (A), (B) and (C) at the proportions of 10-49 mol %, 1-40 mol % and 50 mol %, respectively, provided the total of the structural units (A) and (B) is 50 mol %.

3. A cholesteric liquid crystal polyester as set forth in claim 1, characterized by containing the structural units (A), (B) and (C) at the proportions of 20-47 mol %, 3-30 mol % and 50 mol %, respectively, provided the total of the structural units (A) and (B) is 50 mol %.

* * * * *